United States Patent [19]  [11]  4,207,745
Pouillange  [45]  Jun. 17, 1980

[54] DEVICE FOR HELIUM TRANSFER BETWEEN ROTATING AND NON-ROTATING MEMBERS

[75] Inventor: Jean-Paul Pouillange, Aulnay-sous, France

[73] Assignee: BBC Brown, Boveri & Cie., Baden, Switzerland

[21] Appl. No.: 882,094

[22] Filed: Mar. 1, 1978

[30] Foreign Application Priority Data

Mar. 3, 1977 [FR] France ............................. 77 06189

[51] Int. Cl.$^2$ ............................................. F17C 7/02
[52] U.S. Cl. ........................................ 62/55; 62/505; 277/15; 285/47; 285/DIG. 5; 310/54; 310/61
[58] Field of Search ................... 62/55, 505; 310/54, 310/61; 277/15; 285/47, DIG. 5

[56] References Cited

U.S. PATENT DOCUMENTS

| | | | |
|---|---|---|---|
| 3,626,717 | 12/1971 | Lorch | 62/505 |
| 3,845,639 | 11/1974 | Smith, Jr. et al. | 62/505 |
| 3,991,587 | 11/1976 | Laskaris | 62/55 |
| 4,011,732 | 3/1977 | Doherty et al. | 62/55 |
| 4,018,059 | 4/1977 | Hatch | 62/505 |

Primary Examiner—Ronald C. Capossela
Attorney, Agent, or Firm—Burns, Doane, Swecker & Mathis

[57] ABSTRACT

A device for transferring helium between rotating and non-rotating members includes first and second transfer reeds and a cylindrical sleeve. The cylindrical sleeve is provided between the first and second reeds and extends substantially throughout the region of axial overlap of the reeds. One of the reeds rotates with the rotating member while the other reed is fixed. Third and fourth coaxial transfer reeds may be provided for the transfer of gaseous helium. The third and fourth reeds concentrically surround the first and second reeds with one of the reeds rotating and the other reed being fixed. Cylindrical sleeve members are provided between adjacent reeds with the sleeve members all rotating with the rotating member. The sleeve members are connected to one another at opposite end of the intermediate sleeve member. Guide means may be provided to cancel a component of rotation of the gaseous helium. A bayonet fixing device releasably attaches the cylindrical sleeve to the rotating member.

13 Claims, 2 Drawing Figures

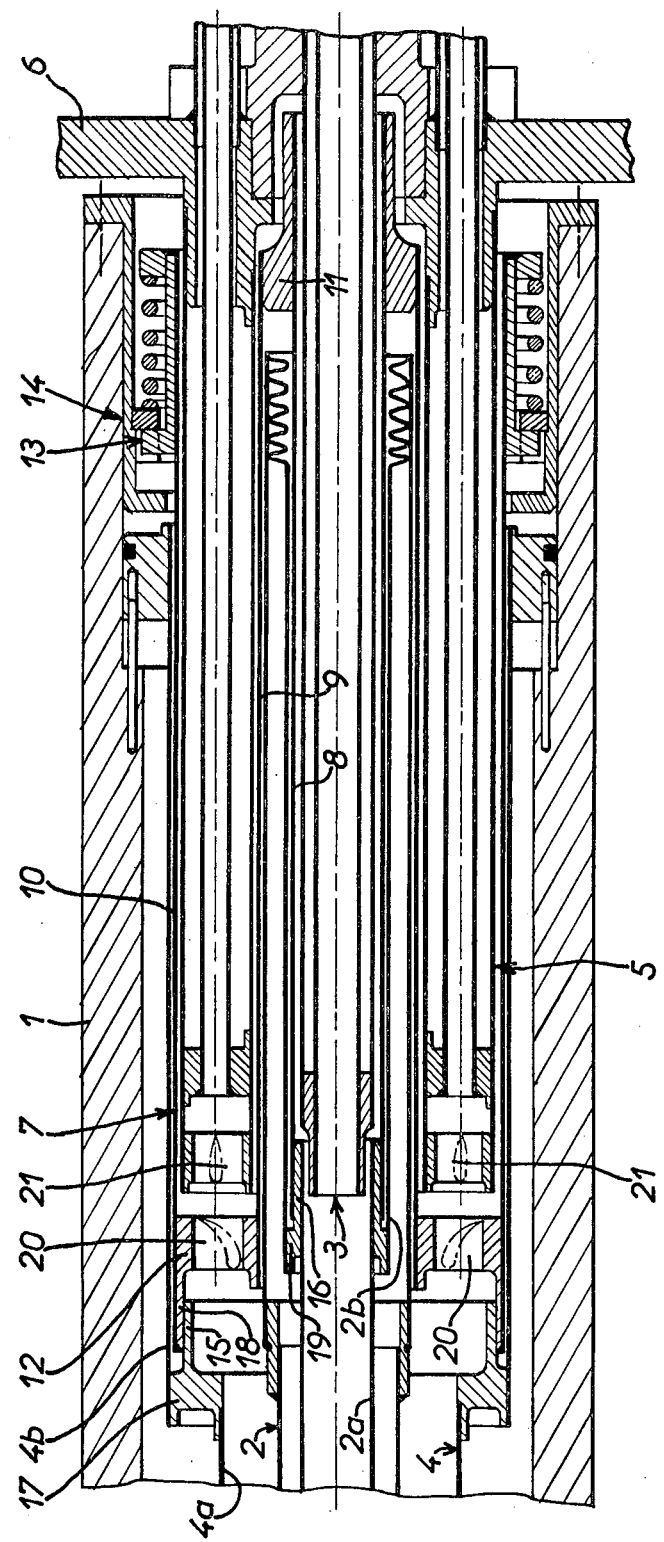

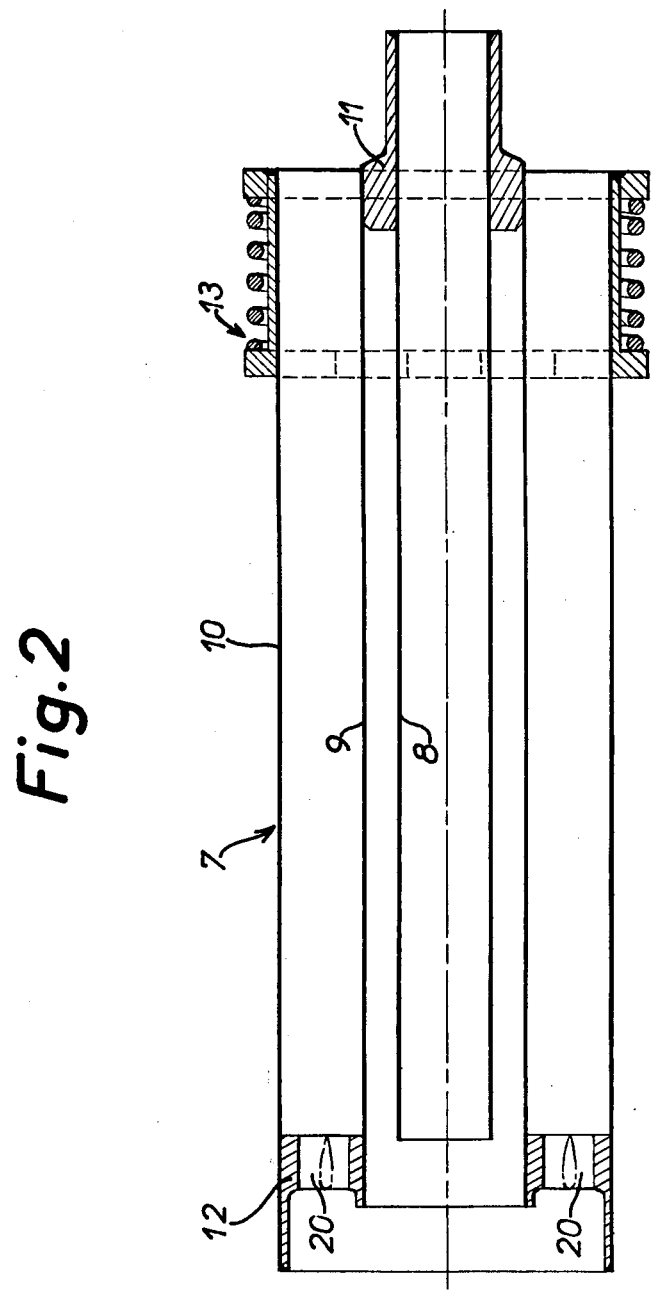

DEVICE FOR HELIUM TRANSFER BETWEEN ROTATING AND NON-ROTATING MEMBERS

BACKGROUND AND SUMMARY OF THE PRESENT INVENTION

The present invention relates to an improved device for enabling helium to be transferred at a very low temperature between non-rotating member of a refrigerating machine and a rotating member, such as the rotor of a rotating electrical machine having a superconducting rotor winding.

In rotating electrical machines having superconducting windings, devices for the transfer of helium typically have to be able to inject liquid helium at a very low temperature (4.2° K) into a cryostat containing a superconducting winding to cool the winding. The devices also have to be able to extract the gaseous helium from the cryostat after the helium has become heated from being in contact with the superconducting winding. Finally, the devices are used to return the gaseous helium to the refrigerating machine to be reliquified.

In rotating electrical machines having superconducting windings which are the least advanced on thermodynamic and thermal planes, the gaseous helium is extracted at an ambient temperature by the transfer device. Such an arrangement requires the use of a refrigerating machine having great power and consuming a great deal of energy because it has to be capable of causing the helium to pass from the gaseous state (at the ambient temperature) to the liquid state (at a temperature of about 4.2° K.).

In machines which are most highly developed on thermodynamic and thermal planes, the helium transfer device includes an outlet for gaseous helium at a very low temperature (of the order of 6° K.) and an outlet for gaseous helium at ambient temperature. The latter outlet is intended to return to the refrigerating machine the gaseous helium used to cool the current supply lines leading to the inductor and the suspension members. In this arrangement, the refrigerating machine can have a much lower power rating because a greater proportion of the helium which is cooled by the refrigerating machine so as to be liquified is already at a very low temperature.

The necessary presence of a refrigerating machine relatively close to a rotating electrical machine having superconducting windings, and the necessity of enclosing the superconducting windings in cryostats which are responsible for thermal insulation, limits the application of superconductors to heavy torque machines such as turbo-alternators and naval propulsion motors. The reliability demanded from these machines is very high. A failure of the helium transfer device in these machines would risk causing the machine to be out of action for a long time. As is presently known, the device for the transfer of helium is generally mounted at the end of a shaft of the machine which does not transmit mechanical torque, and therefore cannot be duplicated.

In the simplest case, that is to say when it is a question of supplying a fixed cryostat with liquid helium, the liquid helium is always conveyed from a liquid helium reservoir to the fixed cryostat by means of what is called a transfer reed. It is a pipe with two walls between which a high vacuum is maintained. The injection of liquid helium into a rotating cryostat is effected in a similar manner but using two coaxial transfer reeds, namely a rotating transfer reed mechanically connected to the rotor of the rotating electrical machine and a fixed transfer reed connected to the liquid helium reservoir and partially engaged in the rotating transfer reed. An escape of helium inevitably occurs in the overlapping region of the two transfer reeds and passes progressively from the temperature of the liquid helium to the ambient temperature. In order to limit this escape and to avoid convection movements in the gaseous helium, only a slight radial play is tolerated between the fixed and rotating transfer reeds.

In the more advanced machines in which the greater portion of the gaseous helium is extracted at low temperature, the extraction of gaseous helium at a very low temperature may also be effected by means of two transfer reeds respectively fixed and rotating, partially engaged one in the other and concentric with the transfer reeds for the injection of the liquid helium. The two transfer reeds for the extraction of the gaseous helium at a very low temperature are thus subjected to similar conditions with regard to their relative radial play in their overlapping region.

The extraction of gaseous helium at ambient temperature generally does not present any problem and may be effected concentrically and outside the transfer reeds for the injection of liquid helium and, where appropriate, outside the transfer reeds for the extraction of gaseous helium at a very low temperature.

As seen above, the radial clearances between the fixed reed or reeds and the rotating reed or reeds are very slight. The end of the shaft of the rotating electrical machine, where the transfer device is located, may vibrate intensely with the result that friction may occur between the fixed reed or reeds and the rotating reed or reeds. In the long run, such friction may lead to perforation of the one reed or of the other and consequently lead to a loss of vacuum in the vacuum compartment of the transfer reed which has been perforated. Such an incident would cause a very long stoppage of the machine.

The essential object of the present invention is to avoid perforation of the transfer reeds as a result of friction between them and consequently to increase the reliability of the helium transfer device.

For this purpose, the present invention provides a device for the transfer of helium between a fixed refrigerating machine and a rotating cryostat of a rotating electrical machine having a superconducting rotor winding. The device includes two coaxial transfer reeds for the supply of liquid helium, with one of the two supply reeds rotating with the rotating cryostat and the other supply reed being relatively fixed. The fixed reed is partially engaged in the rotating supply reed with a slight radial clearance provided in their overlapping region. A cylindrical sleeve which is mounted for rotation with the rotating supply reed extends axially between the two supply reeds, substantially over the whole axial extent of their overlapping region.

BRIEF DESCRIPTION OF THE DRAWINGS

One form of embodiment of the present invention will now be described with reference to the accompanying drawings in which:

FIG. 1 is a cross sectional view of a portion of a helium transfer device according to the present invention, mounted at one end of a shaft of a rotating electrical machine having a superconducting rotor winding; and FIG. 2 is a cross sectional view of a cylindrical sleeve forming part of the helium transfer device illustrated in FIG. 1.

DETAILED DESCRIPTION OF THE PREFERRED EMBODIMENT

With reference to FIG. 1, a hollow shaft 1 of a rotating electrical machine having a superconducting rotor winding includes a helium transfer device according to the present invention mounted at one end of the shaft.

The helium transfer device includes, in a known manner, a rotating transfer reed 2 and a fixed transfer reed 3 for the supply of liquid helium. A rotating transfer reed 4 and a fixed transfer reed 5 are provided concentrically with the reeds 2 and 3 for the outlet of gaseous helium at a very low temperature. All of the reeds include, in a known manner, a pipe having two walls between which is maintained a high vacuum. It will be noted, however, that in the case of the rotating reed 4, the external wall of this reed is closed by the shaft 1 itself.

The two rotating reeds 2 and 4 are connected in a known manner, at their left-hand ends (not illustrated) to a rotor cryostat (not illustrated) of the rotating electrical machine having the superconducting rotor winding. The vacuum compartments of these two rotating reeds 2 and 4 may either communicate with the vacuum compartment of the rotor cryostat or may be individually sealed.

The two fixed reeds 3 and 5 are supported in a known manner by an end plate 6 connected to a case (not illustrated) of the rotating electrical machine. The reeds 3 and 5 are connected, at their right-hand ends (not shown) to a conventional refrigerating machine (likewise not shown). Similarly, the vacuum compartments of the two fixed reeds 3 and 5 may either be connected in a known manner to a vacuum pump or be individually sealed.

With continued reference to FIG. 1, the rotating reed 4 is disposed concentrically around the rotating reed 2 and the fixed reed 5 is disposed concentrically around the fixed reed 3. The fixed reeds 3 and 5 are coaxial with the rotating reeds 2 and 4 and are respectively partially engaged in the rotating reeds 2 and 4 with a slight radial clearance in their overlapping regions. Moreover, the fixed reed 5 partially overlaps the rotating reed 2, likewise with a slight radial clearance in their overlapping region.

According to the present invention, in order to protect the fixed and rotating reeds in the regions of overlap, a sleeve 7 (see FIG. 2) is provided to enable the fixed and rotating reeds to be isolated from one another. The sleeve 7 includes three concentric cylinders 8, 9 and 10. The internal cylinder 8 and the intermediate cylinder 9 are connected to one another, at one end, by an annular spacing member 11. Similarly, the intermediate cylinder 9 and the external cylinder 10 are connected to one another by another annular spacing member 12 at the other end of the intermediate cylinder 9. The cylinders 9 and 10 are connected at the end of the cylinder 9 which is opposite the end which is connected to the internal cylinder 8 by the member 11.

At the end opposite to that which is connected to the intermediate cylinder 9 by the member 12, the cylinder 10 carries a detachable fixing device 13 which can cooperate with a complementary fixing device 14 carried by the shaft 1 (see FIG. 1). The complementary fixing devices 13 and 14 may, for example, include a known locking device of the bayonet type, in such a manner as to permit an easy and rapid assembly and dismantling of the sleeve 7 and also to permit a driving of the sleeve in rotation by the shaft 1.

The sleeve 7 is placed in position inside the shaft 1 before the fixed reeds 3 and 5 are engaged respectively in the rotating reeds 2 and 4. In this way, the external tube 10 is engaged inside the rotating reed 4 and simultaneously the intermediate cylinder 9 and the internal cylinder 8 cover the end portion of the rotating reed 2. With reference to FIG. 1, the respective left-hand ends of both the external tube 10 and the internal tube 8 are supported respectively by supports 15 and 16 disposed respectively inside the rotating reed 4 and inside the rotating reed 2.

The internal wall of the rotating reed 4 is formed by two coaxial tubes 4a and 4b having different diameters. The adjacent ends of the tubes are connected to one another by an annular member 17. The support 15 is formed by an axial extension of the annular member 17, with a space being formed between the extension 15 and the tube 4b to receive an axial extension 18 of the annular member 12.

Similarly, the internal wall of the rotating reed 2 is formed by two coaxial tubes 2a and 2b having different diameters. The adjacent ends of the tubes are connected to one another by an annular member 19. The support 16 includes an axial extension of the annular member 19, and a space is formed between this extension 16 and the tube 2b to receive the free end of the internal cylinder 8 of the sleeve 7.

Once the sleeve 7 has been placed in position as described above, the fixed reeds 3 and 5 are engaged inside the sleeve 7 and the end plate 6 is fixed to the case of the rotating electrical machine. When the elements have been placed in position, the internal cylinder 8 of the sleeve 7 separates the external wall of the fixed reed 3 from the internal wall of the rotating reed 2. The intermediate cylinder 9 separates the external wall of the rotating reed 2 from the internal wall of the fixed reed 5. Finally, the external cylinder 10 separates the external wall of the fixed reed 5 from the internal wall of the rotating reed 4. These separations extend over the entire axial extent of the overlapping regions between the fixed and rotating reeds.

The cylinders 8, 9 and 10 of the sleeve 7 are preferably made of a softer material than the material of the fixed and rotating reeds. As a result of the sleeve 7, it is thus possible to prevent the rotating reeds 2 and 4 from being perforated as a result of possible friction. Such friction is inevitable, due to vibration and a perforation might occur between the fixed and rotating reeds if the sleeve 7 were omitted. As a result of the friction, however, the sleeve 7 may wear and become perforated but the perforation does not substantially interrupt the operation of the machine. Because of the detachable fixing devices 13 and 14, the sleeve 7 can be easily and rapidly replaced by a fresh sleeve. Furthermore, if one of the two fixed reeds 3 and 5 is perforated as a result of friction between the reed and the sleeve 7, the disadvantage is less serious than results from a perforation of one or the other of the two rotating reed 2 and 4. Because the fixed reeds 3 and 5 can be replaced much more easily than can the rotating reeds 2 and 4 a prolonged stoppage of the machine which would result if the rotating reeds were perforated, is avoided.

The operation of the transfer device which has been described above can be further improved. The gaseous helium at a very low temperature which leaves the rotating reed 4 and enters the fixed reed 5 is given a movement of rotation as a result of the rotation of the rotor of the rotating electrical machine. Consequently, on entering the fixed reed 5, the gaseous helium is braked by friction against the inner wall of the fixed reed 5 and becomes heated to the detriment of the thermodynamic efficiency of the entire installation. In order to avoid this result, according to the present invention, the annular member 12 is made in the form of a wheel which is equipped with guide vanes 20 which rotate with the sleeve 7. In addition, fixed blades 21 are provided at the end of the fixed reed 5. The rotating blades 20 and the fixed blades 21 cooperate with one another and are orientated in such a manner as to cancel the component of rotation in the velocity of the gaseous helium which leaves the rotating reed 4 and enters the fixed reed 5.

It is understood that the form of embodiment of the invention which has been described above has been given by way of a purely indicative and in no way limiting example and that numerous modifications may be made without departing from the scope of the present invention. Thus, in particular, the invention has been described above in its application to an advanced rotating electrical machine in which the gaseous helium which has served for the cooling of the superconducting rotor winding is extracted at a very low temperature. Nevertheless, the invention is likewise applicable to less highly developed rotating electrical machines in which the gaseous helium is extracted at ambient temperature. In this case, the transfer device only comprises a single fixed transfer reed and a single rotating transfer reed for the supply of liquid helium. In this case, the sleeve would only include a single cylinder.

What is claimed is:

1. A device for the transfer of helium between rotating and non-rotating members, comprising:
   first and second coaxial transfer reeds for the transfer of liquid helium, the first transfer reed being adapted to rotate with the rotating member, the second transfer reed being adapted to be fixed with respect to the non-rotating member, one of the transfer reeds being partially engaged in the other transfer reed with a slight radial clearance being provided in the region of axial overlap of the first and second coaxial transfer reeds; and
   a cylindrical sleeve made from a softer material than the material of the first and second coaxial transfer reeds and mounted for rotation with the first rotating transfer reed, said cylindrical sleeve having first and second ends and extending axially in the slight radial clearance provided in the region of axial overlap of the first and second coaxial transfer reeds throughout substantially the entire region of axial overlap, whereby said cylindrical sleeve has a tendency to wear and become perforated before said first and second transfer reeds.

2. The device of claim 1 wherein the second coaxial transfer reed is partially engaged in the first coaxial transfer reed.

3. The device of claim 1 further comprising:
   releasable means for detachably fixing the first end of the cylindrical sleeve to the rotating member.

4. The device of claim 3 wherein the releasable means includes first and second bayonet-type fixing members, one of the bayonet-type fixing members being provided on the first end of the cylindrical sleeve and the other of the bayonet-type fixing members being provided on the rotating member.

5. The device of claim 3 wherein the first rotating transfer reed further includes a support for the second end of the cylindrical sleeve.

6. The device of claim 1 further comprising:
   third and fourth coaxial transfer reeds for the transfer of gaseous helium at very low temperatures, the third and fourth transfer reeds being concentric with the first and second transfer reeds, the third transfer reed being adapted to rotate with the rotating member and the fourth transfer reed being adapted to be fixed with respect to the non-rotating member, one of the third and fourth coaxial transfer reeds being partially engaged in the other of the third and fourth transfer reeds with a slight radial clearance being provided in the region of axial overlap of the third and fourth transfer reeds; and wherein
   the cylindrical sleeve includes first, second and third concentric cylindrical members, each having first and second ends, the first cylindrical member extending axially between the first and second coaxial transfer reeds, the second cylindrical member extending axially in a region of overlap between the first and second transfer reeds and the third and fourth transfer reeds, and the third cylindrical member extending axially between the third and fourth coaxial transfer reeds.

7. A device for the transfer of helium between rotating and non-rotating members, comprising:
   first and second coaxial transfer reeds for the transfer of liquid helium, the first transfer reed being adapted to rotate with the rotating member, the second transfer reed being adapted to be fixed with respect to the non-rotating member, one of the transfer reeds being partially engaged in the other transfer reed with a slight radial clearance being provided in the region of axial overlap of the first and second coaxial transfer reeds;
   third and fourth coaxial transfer reeds for the transfer of gaseous helium at very low temperatures, the third and fourth transfer reeds being concentric with the first and second transfer reeds, the third transfer reed being adapted to rotate with the rotating member and the fourth transfer reed being adapted to be fixed with respect to the non-rotating member, one of the third and fourth coaxial transfer reeds being partially engaged in the other of the third and fourth transfer reeds with a slight radial clearance being provided in the region of axial overlap of the third and fourth transfer reeds;
   a cylindrical sleeve having first and second ends and extending axially between the first and second coaxial transfer reeds, said cylindrical sleeve including first, second and third concentric cylindrical members each having first and second ends, the first cylindrical member extending axially between the first and second coaxial transfer reeds, the second cylindrical member extending axially in a region of overlap between the first and second transfer reeds and the third and fourth transfer reeds, and the third cylindrical member extending axially between the third and fourth coaxial transfer reed, and wherein the third and fourth coaxial transfer reeds surround the first and second coaxial transfer reeds, and wherein the second cylindrical member is connected at the first end to the first end of the first cylindrical member and is connected at the second end to the second end of the third cylindrical member.

8. The device of claim 7 wherein the cylindrical sleeve is mounted for rotation with the rotating member.

9. The device of claim 8 further comprising:

releasable means for detachably fixing the first end of the third cylindrical member to the rotating member.

10. The device of claim 7 wherein the first rotating transfer reed further includes a support for the second end of the first cylindrical member.

11. The device of claim 7 wherein the cylindrical sleeve further includes rotating guide vane means for cancelling a component of rotation of velocity of the gaseous helium transferred by the third and fourth transfer reeds.

12. The device of claim 11 wherein the fourth coaxial transfer reed further includes fixed guide vane means for cancelling a component of rotation of velocity of the gaseous helium transferred by the third and fourth transfer reeds.

13. A device for the transfer of helium between a fixed refrigerating machine and a rotating cryostat of a rotating electrical machine having a superconducting rotor winding, comprising:

first and second coaxial transfer reeds for the transfer of liquid helium, the first transfer reed being adapted to rotate with the rotating cryostat, the second transfer reed being adapted to be fixed with respect to the refrigerating machine and being partially engaged in the first transfer reed with a slight radial clearance being provided in the region of axial overlap of the first and second reeds;

third and fourth coaxial transfer reeds for the transfer of gaseous helium, the third and fourth transfer reeds concentrically surrounding the first and second reeds, the third transfer reed being adapted to rotate with the rotating cryostat, the fourth transfer reed being adapted to be fixed with respect to the refrigerating machine and being partially engaged in the third transfer reed with a slight radial clearance being provided in the region of axial overlap of the third and fourth reeds, the fourth transfer reed partially overlapping the first transfer reed;

a cylindirical sleeve having first, second and third concentric cylindrical members each having first and second ends, the first cylindrical member extending axially between the first and second coaxial transfer reeds throughout substantially the entire region of overlap of the first and second reeds, the second cylindrical member extending axially between the first and fourth transfer reeds, the third cylindrical member extending axially between the third and fourth transfer reeds;

releasable means for fixing the first end of the third cylindrical member to the rotating cryostat;

first guide vanes provided between the second and third cylindrical members and adapted to rotate with the cryostat; and second guide vanes carried by the fourth transfer reed and adapted to be fixed with respect to the refrigerating machine.

* * * * *